(12) United States Patent
Kitano

(10) Patent No.: US 10,037,467 B2
(45) Date of Patent: Jul. 31, 2018

(54) INFORMATION PROCESSING SYSTEM

(71) Applicant: NEC Corporation, Tokyo (JP)

(72) Inventor: Takatoshi Kitano, Tokyo (JP)

(73) Assignee: NEC Corporation, Tokyo (JP)

( * ) Notice: Subject to any disclaimer, the term of this patent is extended or adjusted under 35 U.S.C. 154(b) by 198 days.

(21) Appl. No.: 15/023,807

(22) PCT Filed: Jul. 9, 2014

(86) PCT No.: PCT/JP2014/003631
§ 371 (c)(1),
(2) Date: Mar. 22, 2016

(87) PCT Pub. No.: WO2015/045233
PCT Pub. Date: Apr. 2, 2015

(65) Prior Publication Data
US 2016/0239712 A1 Aug. 18, 2016

(30) Foreign Application Priority Data

Sep. 26, 2013 (JP) ................................ 2013-200065

(51) Int. Cl.
*G06K 9/00* (2006.01)
*G06T 7/73* (2017.01)
*G06T 7/246* (2017.01)

(52) U.S. Cl.
CPC ..... *G06K 9/00744* (2013.01); *G06K 9/00187* (2013.01); *G06K 9/00221* (2013.01);
(Continued)

(58) Field of Classification Search
CPC .......... G06K 9/00744; G06K 9/00751; G06K 9/00187; G06K 9/00221; G06K 9/00268;
(Continued)

(56) References Cited

U.S. PATENT DOCUMENTS 5,103,305 A * 4/1992 Watanabe ............... G06T 7/246
348/700
5,689,575 A * 11/1997 Sako .................. G06K 9/00228
382/118

(Continued)

FOREIGN PATENT DOCUMENTS

JP 2009-123095 6/2009
JP 2012-123460 6/2012

OTHER PUBLICATIONS

International Search Report and Written Opinion dated Oct. 7, 2014 in corresponding PCT International Application.

*Primary Examiner* — Manav Seth
(74) *Attorney, Agent, or Firm* — Finnegan, Henderson, Farabow, Garrett & Dunner, L.L.P.

(57) ABSTRACT

This information processing system comprises: an object detection unit which detects and tracks an object in motion video data and detects a plurality of object elements which represent elements of the object; a feature value extraction unit which extracts respective feature values for each of the object elements from frame images which configure the motion video data; a frame selection unit which selects, for each object element, the frame images which satisfy respective frame selection criteria which are set for each object element; and a feature value linking unit which links frame specification information which specifies the frame images which are selected with the frame selection unit for each object element, and the object element feature values which are extracted from the selected frame images, and stores same in a prescribed storage unit.

16 Claims, 12 Drawing Sheets

(52) U.S. Cl.
CPC ..... *G06K 9/00268* (2013.01); *G06K 9/00281* (2013.01); *G06K 9/00751* (2013.01); *G06T 7/246* (2017.01); *G06T 7/73* (2017.01)

(58) Field of Classification Search
CPC ........ G06K 9/00281; G06K 2017/0045; G06T 7/246; G06T 7/73
See application file for complete search history.

(56) References Cited

U.S. PATENT DOCUMENTS

| | | | | |
|---|---|---|---|---|
| 5,864,630 A * | 1/1999 | Cosatto | ............. | G06K 9/00235 382/103 |
| 6,173,068 B1 * | 1/2001 | Prokoski | ............. | A61B 5/1176 382/115 |
| 6,185,314 B1 * | 2/2001 | Crabtree | ............. | G01S 3/7865 348/169 |
| 6,263,088 B1 * | 7/2001 | Crabtree | ............. | G01S 3/7865 348/169 |
| 6,633,655 B1 * | 10/2003 | Hong | ............. | G02B 27/225 348/E13.022 |
| 6,795,567 B1 * | 9/2004 | Cham | ............. | G06T 7/246 382/103 |
| 7,194,110 B2 * | 3/2007 | Qian | ............. | G06T 7/246 348/169 |
| 7,551,754 B2 * | 6/2009 | Steinberg | ............. | G06K 9/00221 348/135 |
| 7,630,527 B2 * | 12/2009 | Steinberg | ............. | G06K 9/00228 348/77 |
| 7,844,076 B2 * | 11/2010 | Corcoran | ............. | G06K 9/00228 348/152 |
| 8,194,938 B2 * | 6/2012 | Wechsler | ............. | G06K 9/00288 382/118 |
| 8,265,392 B2 * | 9/2012 | Wang | ............. | G06K 9/00248 382/173 |
| 8,300,935 B2 * | 10/2012 | Distante | ............. | A63B 24/0021 382/103 |
| 2005/0094849 A1 * | 5/2005 | Sung | ............. | G06K 9/00248 382/103 |
| 2006/0067562 A1 * | 3/2006 | Kamath | ............. | G06T 7/254 382/103 |
| 2007/0269082 A1 * | 11/2007 | Matsuyama | ............. | G06K 9/00241 382/118 |
| 2012/0140982 A1 * | 6/2012 | Sukegawa | ............. | G06K 9/00221 382/103 |

\* cited by examiner

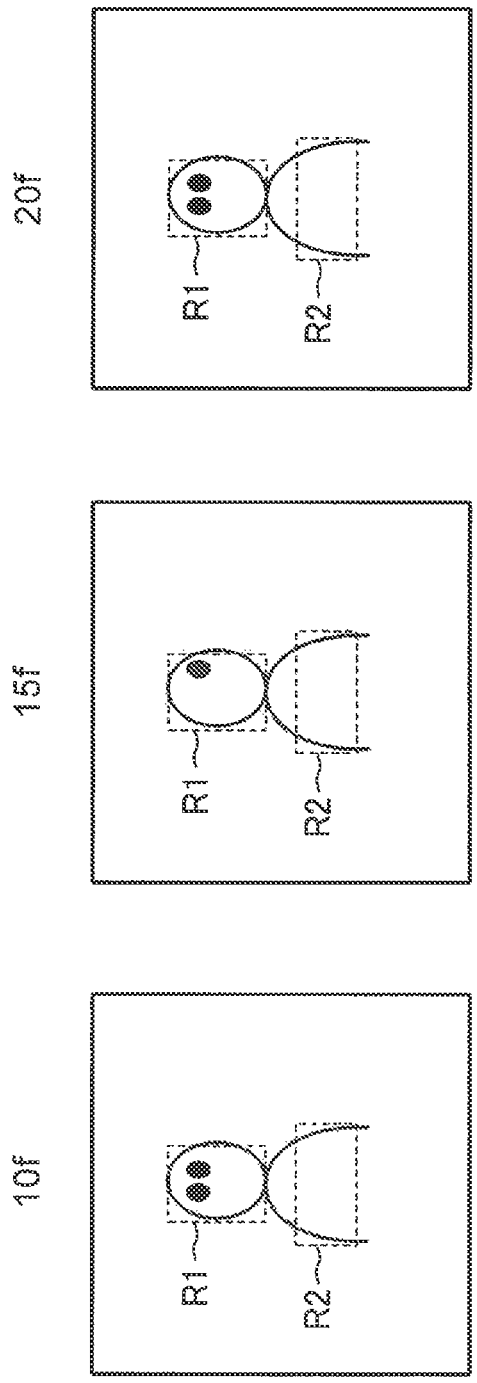

Fig. 3A

| PERSON ID=1 FRAME / MODAL | 5f | 10f | 15f | 20f | 25f | 30f | 35f | 40f | 45f | 50f |
|---|---|---|---|---|---|---|---|---|---|---|
| FACE | ☐ | ● | ☐ | ☐ | ☐ | ☐ | ● | ☐ | ☐ | ☐ |
| CLOTHES | ☐ | ☐ | ● | ☐ | ☐ | ● | ☐ | ☐ | ☐ | ☐ |
| SEX/AGE | ☐ | ☐ | ☐ | ● | ☐ | ☐ | ☐ | ● | ☐ | ☐ |

B1: 5f–25f
B2: 30f–50f

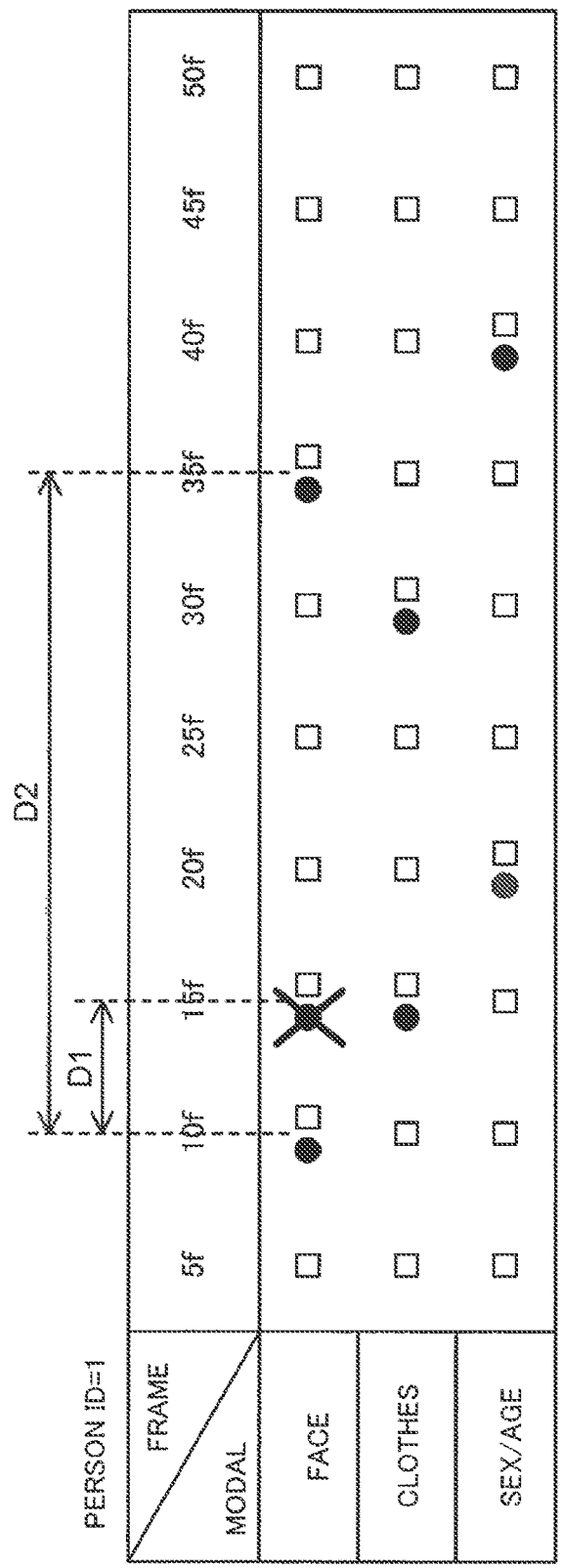

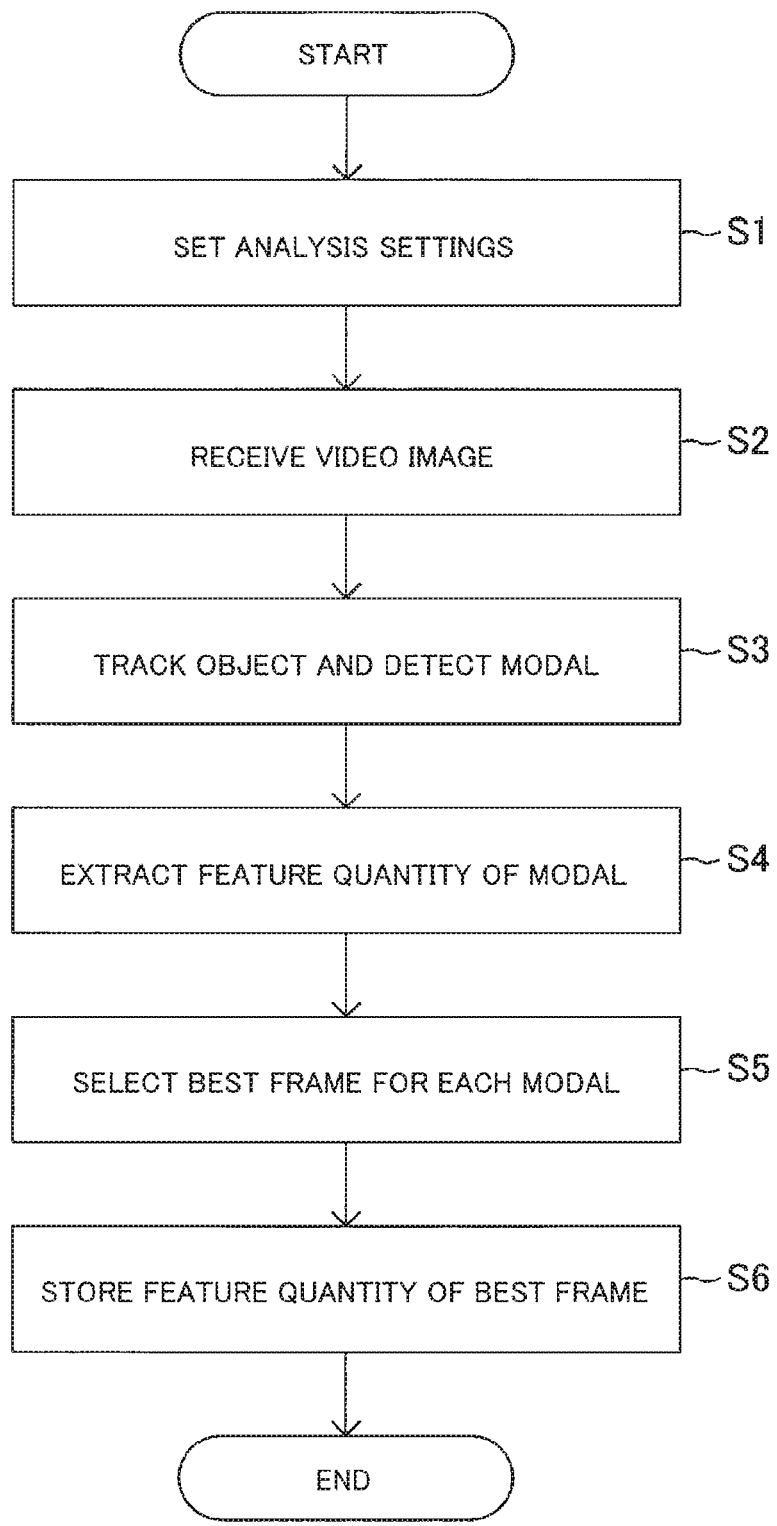

INFORMATION PROCESSING SYSTEM

CROSS-REFERENCE TO RELATED PATENT APPLICATIONS

This application is a National Stage Entry of International Application No. PCT/JP2014/003631, filed Jul. 9, 2014, which claims priority from Japanese Patent Application No. 2013-200065, filed Sep. 26, 2013. The entire contents of the above-referenced applications are expressly incorporated herein by reference.

TECHNICAL FIELD

The present invention relates to an information processing system, and more particularly, to an information processing system which performs an analysis process with respect to an image captured by a camera.

BACKGROUND ART

In recent years, as information processing technologies have been developed, development of analysis systems which analyze various data is carried out. For instance, there is implemented an analysis system, in which an object such as a person or a physical object is detected from images captured by a camera for searching a specific object. In an analysis system in which an object is searched as described above, a feature quantity in the object is extracted from frame images in a captured moving image, and the search for the object in the images is performed using the extracted feature quantity.

PTL 1 discloses a system in which a person displayed in a moving image is searched. Specifically, in the system disclosed in PTL 1, a specific event is detected in a moving image, and a frame image having a highest value regarding a predetermined index, such as a frame image having a largest face area or a frame image in which a human face is oriented in the front direction as much as possible, is selected as a best shot image among frame images included in the detected event. Then, a processing such as extracting the feature quantity of the face from the frame image selected as the best shot image is performed, and a person is searched from the moving image using the extracted feature quantity.

CITATION LIST

Patent Literature

[PTL 1] Japanese Laid-open Patent Publication No. 2012-123460

SUMMARY OF INVENTION

Technical Problem

In the technique described in PTL 1, however, a best shot image based on a predetermined index is selected solely regarding a face, and it is unclear whether a best shot image is determined for a search object other than a face. Thus, a problem occurs that it may be difficult to extract an appropriate feature quantity regarding a plurality of search objects, and it may be impossible to enhance precision of a search result.

In view of the above, an object of the present invention is to provide an information processing system that enables to solve the aforementioned problem being difficult in obtaining a search result regarding a search object in a moving image with high precision.

Solution to Problem

An information processing system to an exemplary aspect of the present invention includes:

an object detecting unit that detects and tracks an object in moving image data, and detects a plurality of object elements from the object, each of the object elements representing an element of the object set in advance and detectable from the object;

a feature quantity extracting unit that extracts a feature quantity of each of the object elements from a frame image constituting the moving image data;

a frame selecting unit that selects the frame image satisfying a frame selection criterion for each of the object elements, the frame selection criterion being set in advance for each of the object elements; and a feature quantity associating unit that associates frame specifying information for specifying the frame image selected by the frame selecting unit with the feature quantity of the object element extracted from the selected frame image, and stores those in a storage unit.

A program, according to the other exemplary aspect of the present invention, causes an information processing device to implement:

an object detecting unit that detects and tracks an object in moving image data, and that detects a plurality of object elements from the object, each of the object elements representing an element of the object set in advance and detectable from the object;

a feature quantity extracting unit which extracts a feature quantity of each of the object elements from frame images constituting the moving image data;

a frame selecting unit that selects the frame image that satisfies a frame selection criterion for each of the object elements, the frame selection criterion being set in advance for each of the object elements; and a feature quantity associating unit that associates frame specifying information for specifying the frame image selected by the frame selecting unit with the feature quantity of the object element extracted from the selected frame image, and stores those in a storage unit.

An information processing method, according to the other exemplary aspect of the present invention, includes:

detecting and tracking an object in moving image data, and detecting a plurality of object elements from the object, each of the object elements representing an element of the object set in advance and detectable from the object;

extracting a feature quantity of each of the object elements from frame images constituting the moving image data;

selecting the frame image that satisfies a frame selection criterion before and after extracting the feature quantity, for each of the object elements, the frame selection criterion being set in advance for each of the object elements; and associating frame specifying information for specifying the frame image selected by the frame selecting unit with the feature quantity of the object element extracted from the selected frame image, and storing those in a storage unit.

An information processing system, according to the other exemplary aspect of the present invention, includes:

a search unit that refers to a storage unit, and searches each of object elements with use of a feature quantity of each of the object elements, the storage unit storing the feature quantity of the object element extracted from a frame image selected based on a frame selection criterion for each of the object elements and frame specifying information for specifying the selected frame image in association with each other, the frame selection criterion being set in advance for each of the object elements representing elements of an object detected in moving image data.

A program, according to the other exemplary aspect of the present invention, causes an information processing device to implement a search unit that refers to a storage unit, and searches each of object elements with use of a feature quantity of each of the object elements, the storage unit storing the feature quantity of the object element extracted from a frame image selected based on a frame selection criterion for each of the object elements and frame specifying information for specifying the selected frame image in association with each other, the frame selection criterion being set in advance for each of the object elements representing elements of an object detected in moving image data.

An information processing method, according to the other exemplary aspect of the present invention, includes:

referring to a storage unit, and searching each of object elements with use of a feature quantity of each of the object elements, the storage unit storing the feature quantity of the object element extracted from a frame image selected based on a frame selection criterion for each of the object elements and frame specifying information for specifying the selected frame image in association with each other, the frame selection criterion being set in advance for each of the object elements representing elements of an object detected in moving image data.

Advantageous Effects of Invention

According to the present invention having the aforementioned configuration, it is possible to provide an information processing system that enables to obtain a search result regarding a search object in a moving image with high precision.

BRIEF DESCRIPTION OF DRAWINGS

FIG. 2 is diagram illustrating an example of a video image to be analyzed by a video analysis unit disclosed in FIG. 1.

FIG. 3A is a diagram illustrating an example of data to be stored in an object feature quantity storage unit disclosed in FIG. 1.

FIG. 3B is a diagram illustrating an example of data to be stored in the object feature quantity storage unit disclosed in FIG. 1.

FIG. 4 is a flowchart illustrating an operation of video analysis to be performed by the video analysis unit disclosed in FIG. 1.

DESCRIPTION OF EMBODIMENTS

First Exemplary Embodiment

Figure 1:
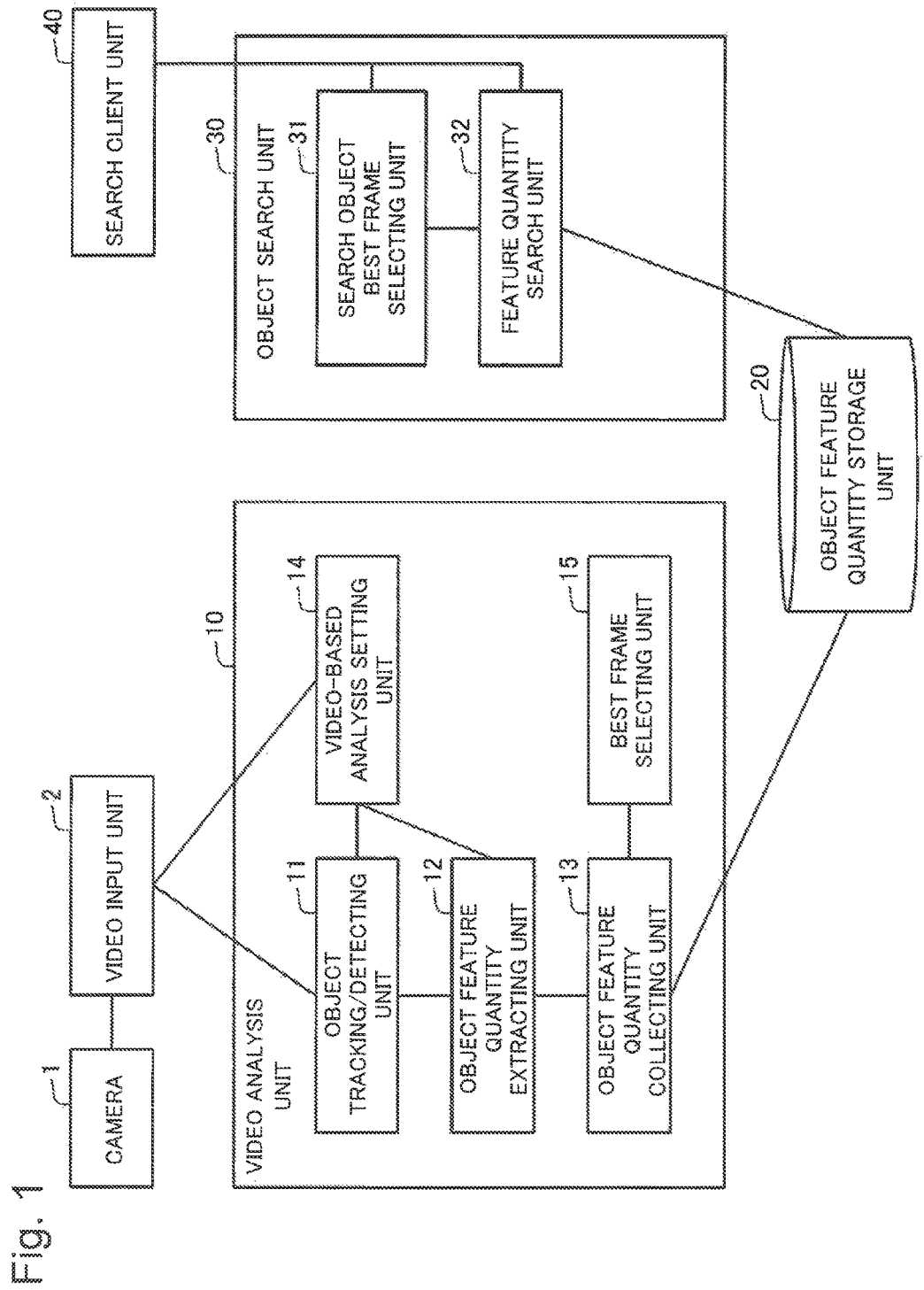
FIG. 1 is a block diagram illustrating a configuration of an information processing system according to a first exemplary embodiment of the present invention.
Figure 5:
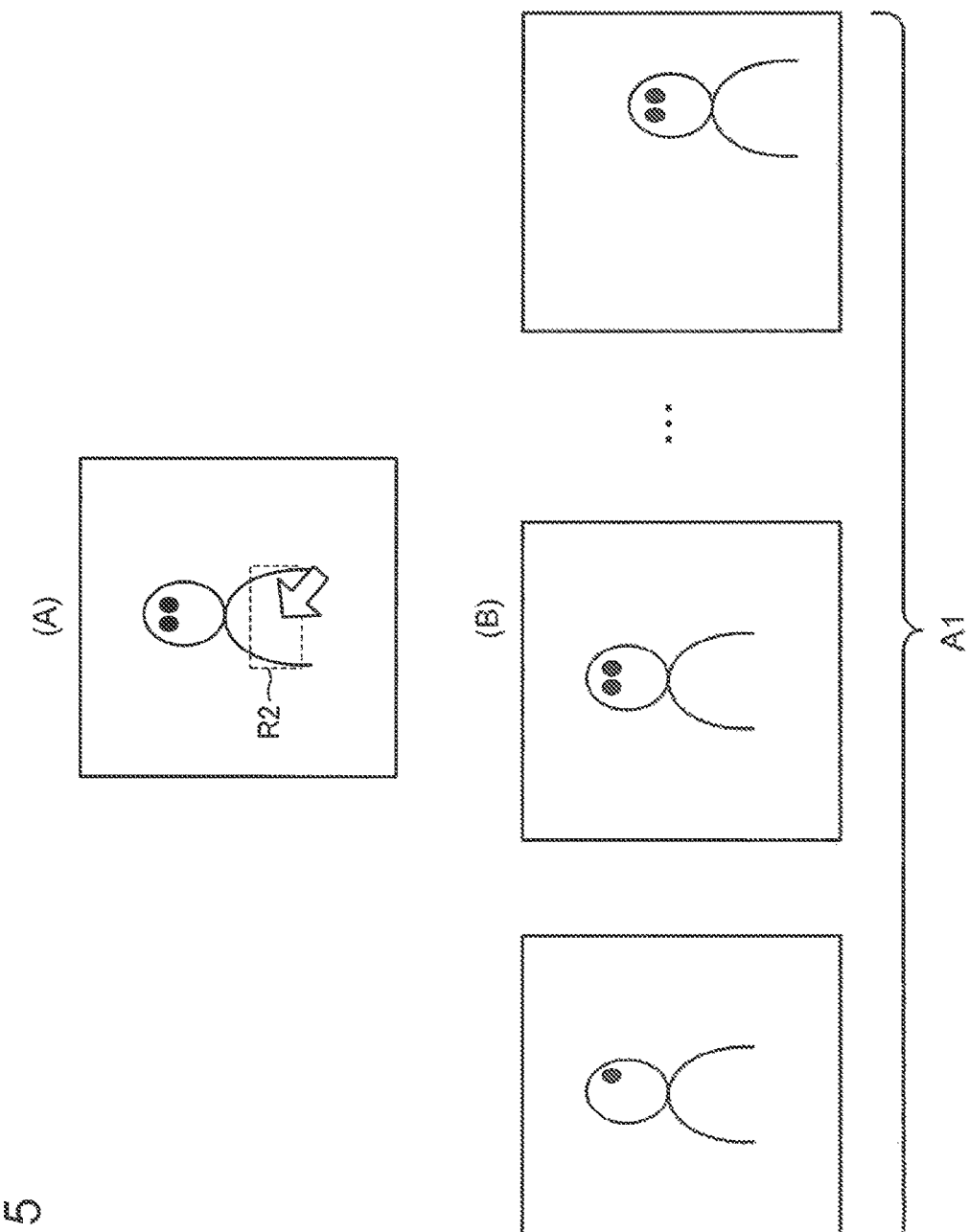
FIG. 5 is diagram illustrating how a search process is performed with use of a video image by an object search unit disclosed in FIG. 1.
Figure 6:
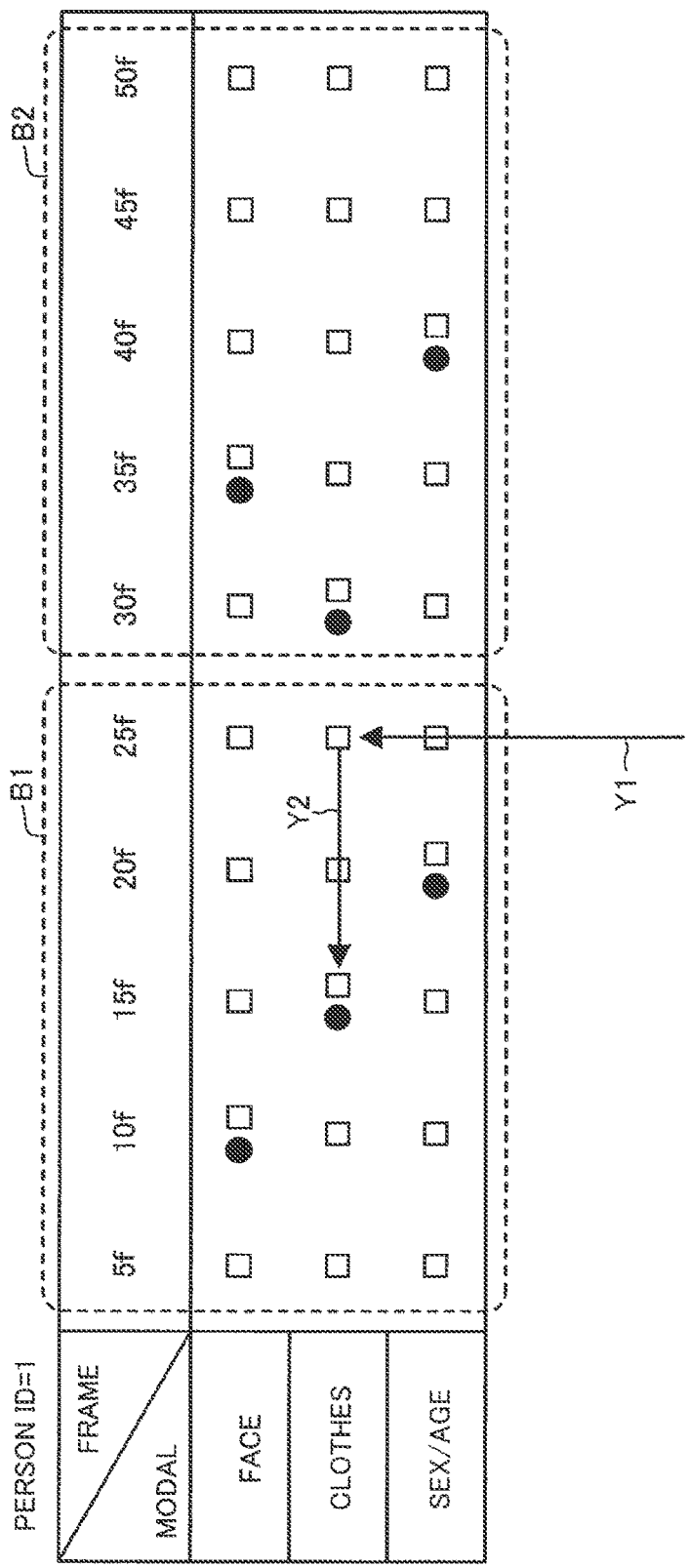
FIG. 6 is a diagram illustrating how a search process is performed with use of data stored in the object feature quantity storage unit by the object search unit disclosed in FIG. 1.
Figure 7:
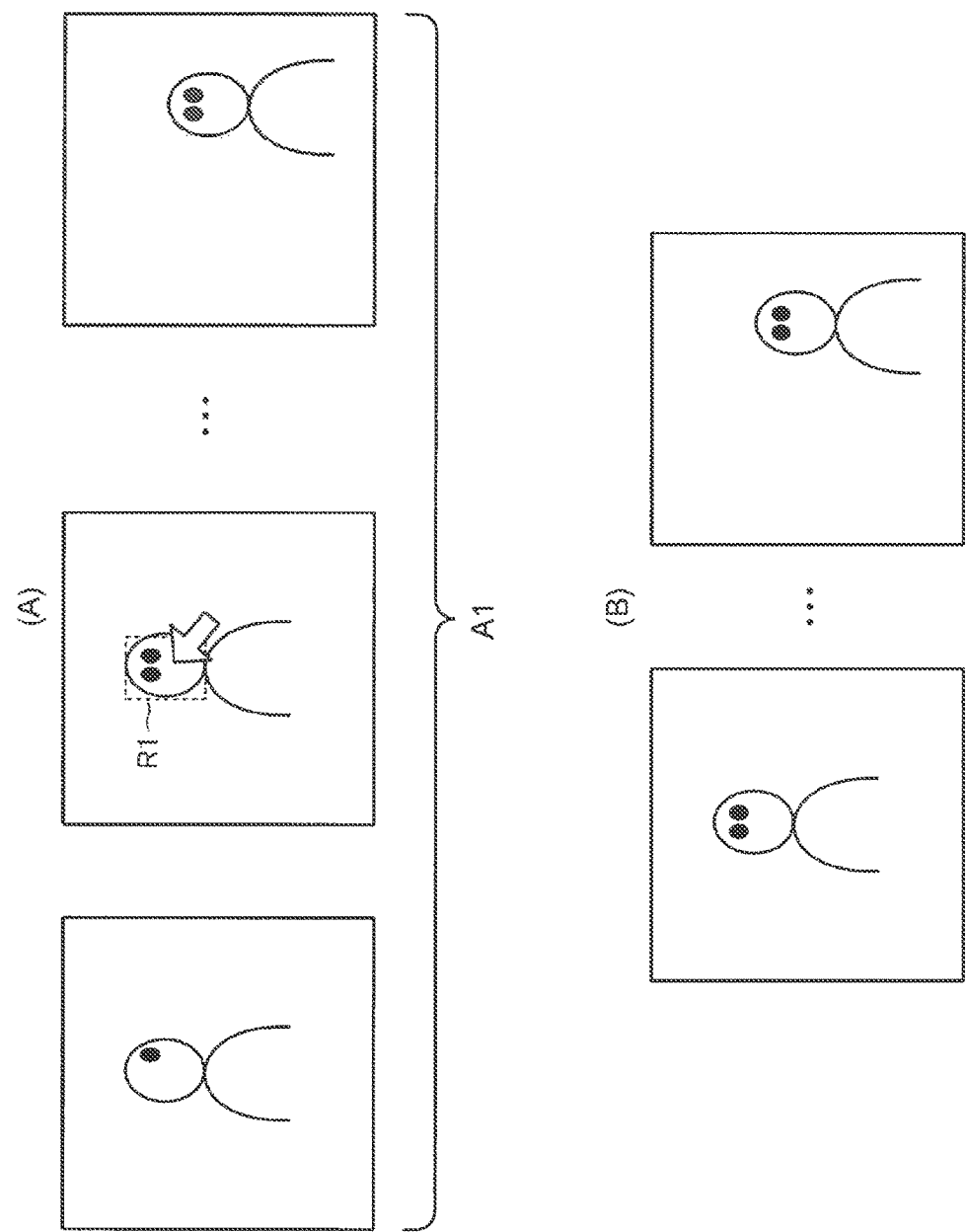
FIG. 7 is diagram illustrating how a search process is performed with use of a video image by the object search unit disclosed in FIG. 1.
Figure 8:
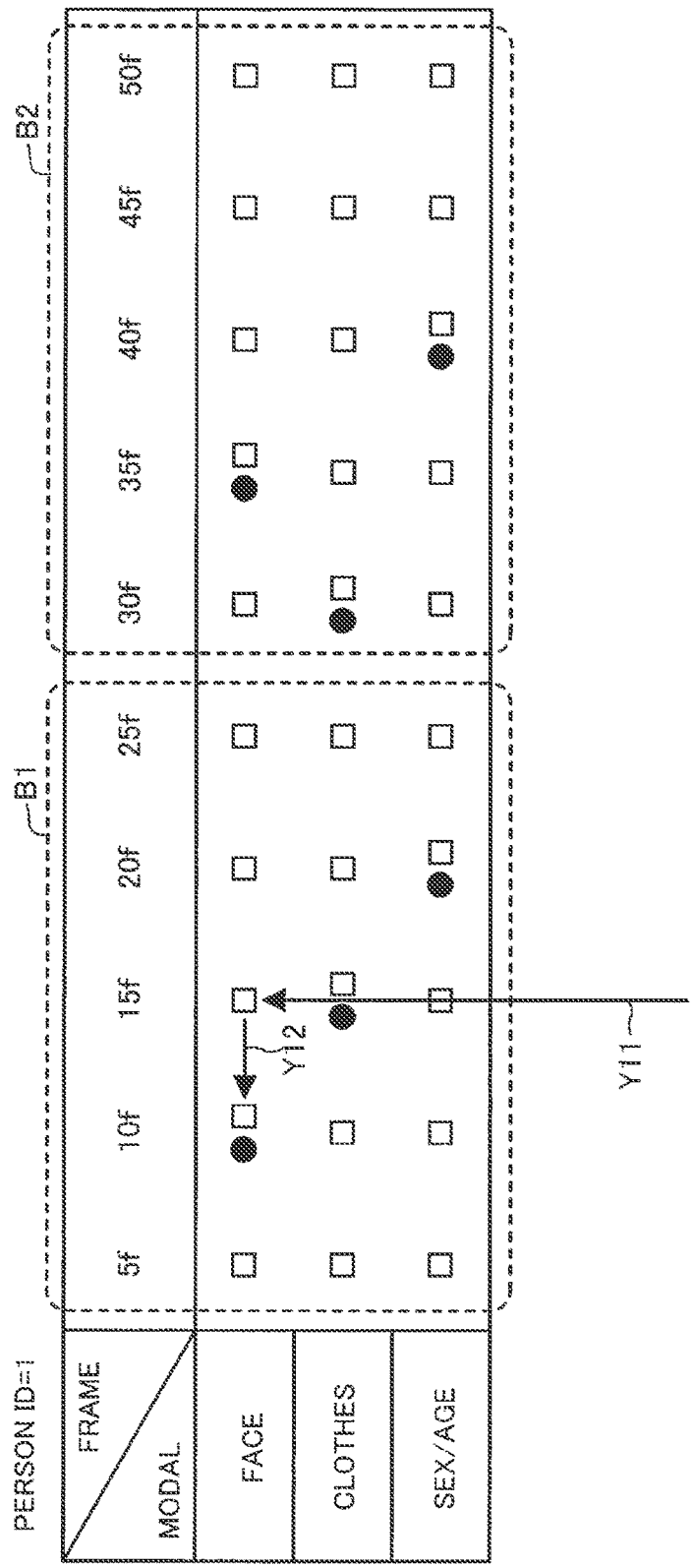
FIG. 8 is a diagram illustrating how a search process is performed with use of data stored in the object feature quantity storage unit by the object search unit disclosed in FIG. 1.
Figure 9:
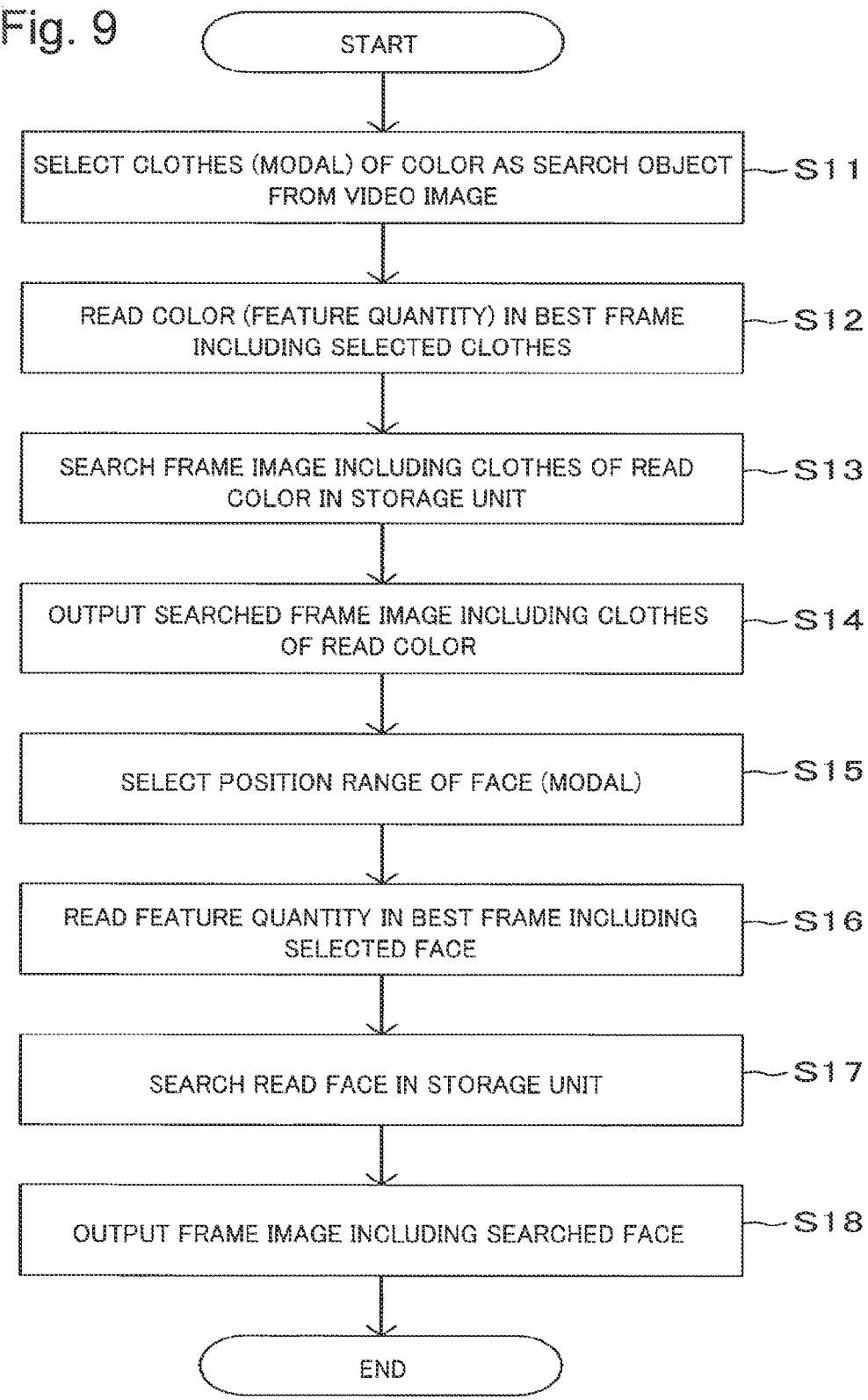
FIG. 9 is a flowchart illustrating an operation of a search process to be performed by the video analysis unit disclosed in FIG. 1.

The first exemplary embodiment of the present invention is described referring to FIG. 1 to FIG. 9. FIG. 1 is a block diagram illustrating a configuration of an information processing system. FIG. 2 and FIG. 3 are diagrams illustrating how a video analysis process is performed. FIG. 4 is a flowchart illustrating an operation of the video analysis process. FIG. 5 to FIG. 8 are diagrams illustrating how a video search process is performed. FIG. 9 is a flowchart illustrating an operation of the video search process.

The information processing system according to the first exemplary embodiment is configured such that an object displayed in a video image, which is moving image data, is detected and tracked, and a feature quantity of the object element, which is an element of the detected object, is extracted and stored. Then, the information processing system performs an intended search with use of the stored feature quantity of the object element. For example, the information processing system according to the first exemplary embodiment is applicable as a system, in which a camera is installed in a town or a city, and a person is searched in a video image captured by the camera. The information processing system to be described in the following, however, is merely an example of the present invention. The information processing system according to the present invention may be used for another purpose of use.

As illustrated in FIG. 1, the information processing system according to the first exemplary embodiment includes a camera 1 which captures a video image in a certain area, and a video input unit 2 which receives the video image captured by the camera 1. The information processing system further includes a video analysis unit 10 which analyzes the acquired video image, and an object feature quantity storage unit 20 which stores the video image and an analysis result of the video image. The information processing system further includes an object search unit 30 which performs a predetermined search in the video image, and a search client unit 40 which instructs the object search unit 30 to perform a search.

The information processing system according to the first exemplary embodiment includes one or more information processing devices. For example, the video input unit 2, the video analysis unit 10, the object search unit 30 and the search client unit 40 may be respectively included in individual information processing devices, or all the constituent elements illustrated in FIG. 1 may be included in one information processing device.

The video analysis unit 10 includes an object tracking/detecting unit 11, an object feature quantity extracting unit 12, an object feature quantity collecting unit 13, a video-based analysis setting unit 14, and a best frame selecting unit 15, which are implemented by a predetermined program installed in an operating device. Further, the object search unit 30 includes a search object best frame selecting unit 31 and a feature quantity search unit 32, which are implemented by a predetermined program installed in an operating device. The object feature quantity storage unit 20 is provided in a storage device equipped in a predetermined information processing device. In the following, each of the constituent elements is described in detail, and an operation of each of the constituent elements is described referring to the flowcharts of FIG. 4 and FIG. 9.

The video-based analysis setting unit 14 sets conditions for the processing of detecting an object or the like by the object tracking/detecting unit 11 or for the processing of extracting a feature quantity by the object feature quantity extracting unit 12 to be described later in accordance with the characteristics of a video image or in accordance with an external condition (Step S1 in FIG. 4). For example, the video-based analysis setting unit 14 sets an appropriate parameter in accordance with the brightness of a video image, which changes by the time or by the weather. Further, the video-based analysis setting unit 14 may change a frame selection criterion of a frame image selected by the best frame selecting unit 15 to be described later in accordance with the characteristics of a video image or in accordance with an external condition.

The object tracking/detecting unit 11 (object detecting unit) accepts input of moving image data composed of a plurality of frame images, which is a video image captured by the camera 1, and acquired by the video input unit 2 (Step S2 in FIG. 4). Subsequently, the object tracking/detecting unit 11 detects and tracks a "person", which is an object displayed in each of the frame images (Step S3 in FIG. 4). For example, the object tracking/detecting unit 11 analyzes a frame image, and determines that an object having a specific feature such as a color of the skin or a contour of the object is a "person", and extracts the area of the "person" in the frame image. Then, the object tracking/detecting unit 11 attaches a person ID, which is identification information for identifying the person, to the area of the "person". Then, the object tracking/detecting unit 11 tracks the area of the same "person" in consecutive frame images or in frame images at a predetermined frame interval, and attaches the same person ID to the areas of the same "person".

Subsequently, the object tracking/detecting unit 11 detects a "modal", which represents an element of a person set in advance, from the areas of the "person" detected in the frame images (Step S3 in FIG. 4). The "modal" includes e.g. "face" or "clothes", which are elements constituting the "person", and further includes "sex/age", which is an element representing an attribute of the "person". The "modal", however, is not limited to the aforementioned elements.

Specifically, the object tracking/detecting unit 11 detects each of the "modals" by a detecting method, which is set in advance for each of the modals. For example, regarding the "face", which is one of the modals, the object tracking/detecting unit 11 detects an area of the skin color portion located at an upper portion of the area of the detected "person", as position information of the "face". Further, regarding the "clothes", which is one of the modals, the object tracking/detecting unit 11 detects an area at a position lower than the position of the face detected as described above of the area of the detected "person", as position information of the "clothes". Further, regarding the "sex/age", which is one of the modals, the object tracking/detecting unit 11 detects the area of the face detected as described above, as position information of the "sex/age". FIG. 2 illustrates an example, in which position information of each of the modals is detected from each of the frame images. In FIG. 2, the reference sign R1 denotes position information of the "face" and the "sex/age", which are modals, and the reference sign R2 denotes position information of the "clothes", which is a modal.

Subsequently, the object tracking/detecting unit 11 associates the information for specifying the area of the "person" detected from each of the frame images and the person ID, and the position information of each of the modals with data of each of the frame images, and transmits those data of the frame images to the object feature quantity extracting unit 12.

The object feature quantity extracting unit 12 (feature quantity extracting unit) extracts a feature quantity of each of the "modals", which is associated with the same person ID, from each of the frame images (Step S4 in FIG. 4). For example, regarding the "face", which is one of the modals, the object feature quantity extracting unit 12 extracts a feature quantity usable in face authentication, such as the distance between the eyes, or information representing the positions of the eyes, the nose and the mouth from the image corresponding to the position information of the detected "face". Further, regarding the "clothes", which is one of the modals, the object feature quantity extracting unit 12 extracts the color of the clothes as a feature quantity from the image corresponding to the position information of the detected "clothes". Further, regarding the "sex/age", which is one of the modals, the object feature quantity extracting unit 12 extracts a feature quantity usable in specifying the sex/age, such as the distance between the eyes, or wrinkles on the face from the image corresponding to the position information of the detected "face".

Subsequently, the object feature quantity extracting unit 12 associates the feature quantity of each of the modals with the position information of each of the modals associated with data of each of the frame images as described above, and transmits the data of the frame images associated with the above plural information to the object feature quantity collecting unit 13.

The object feature quantity collecting unit 13 (feature quantity associating unit) associates the feature quantity of each of the modals received from the object feature quantity extracting unit 12 with the frame number (frame specifying information) for specifying the frame image from which the feature quantity is extracted, and stores the feature quantity of each of the modals in the object feature quantity storage unit 20. Note that the object feature quantity collecting unit 13 does not store all the feature quantity in the object feature quantity storage unit 20, but stores only the feature quantity extracted from the frame image selected as a best frame by the best frame selecting unit 15, for each of the modals (Steps S5 and S6 in FIG. 4).

In the following, the best frame selecting unit 15 (frame selecting unit) is described. The best frame selecting unit 15 selects a best frame for each of the modals in accordance with a frame selection criterion set in advance for each of the modals. In the first exemplary embodiment, as illustrated in FIG. 3A, frame images are sorted in time boxes B1 and B2, each of which is a time range set in advance along a reproduction time period of a video image, and a best frame is selected from the frame images belonging to each of the time boxes B1 and B2 for each of the modals.

For example, in the example of FIG. 3A, five frame images are set to be included in one time box every other five frames. In other words, the 5-th frame image, the 10-th frame image, the 15-th frame image, the 20-th frame image, and the 25-th frame image (5f, 10f, 15f, 20f, and 25f) are included in the time box indicated by the reference sign B1 in FIG. 3A. Further, the 30-th frame image, the 35-th frame image, the 40-th frame image, the 45-th frame image, and the 50-th frame image (30f, 35f, 40f, 45f, and 50f) are included in the time box indicated by the reference sign B2 in FIG. 3A.

Regarding the "face", which is one of the modals, frame selection criteria, such that the distance between the eyes is largest, the orientation of the face is closest to the front direction, and the blur of image of the face is lowest, are set in a time box. For example, the best frame selecting unit 15 selects a frame image having a largest distance between the eyes as a best frame regarding the modal "face" from the frame images in a time box (Step S5 in FIG. 4). In the example of FIG. 3A, the best frame selecting unit 15 selects the frame image 10f in the time box B1 as a best frame regarding the "face", and notifies the selection information to the object feature quantity collecting unit 13. Upon receiving the selection information, the object feature quantity collecting unit 13 associates the feature quantity of the "face" extracted from the best frame with the frame number 10f of the best frame selected regarding the "face" in the time box B1, and stores the feature quantity in the object feature quantity storage unit 20 (Step S6 in FIG. 4). Contrary to the above, the object feature quantity collecting unit 13 does not store the feature quantity of the "face" of the frame images that are not selected as a best frame regarding the "face".

Regarding the "clothes", which is one of the modals, a frame selection criterion such as the assurance on the color of the clothes is highest is set in a time box. For example, the best frame selecting unit 15 selects a frame image that satisfies the aforementioned frame selection criterion as a best frame regarding the modal "clothes" from the frame images in a time box. In the example of FIG. 3A, the best frame selecting unit 15 selects the frame image 15f in the time box B1 as a best frame regarding the "clothes", and notifies the selection information to the object feature quantity collecting unit 13. Upon receiving the selection information, the object feature quantity collecting unit 13 associates the feature quantity of the "clothes" extracted from the best frame with the frame number 15f of the best frame selected regarding the "clothes" in the time box B1, and stores the feature quantity in the object feature quantity storage unit 20. Contrary to the above, the object feature quantity collecting unit 13 does not store the feature quantity of the "clothes" of the frame images that are not selected as a best frame regarding the "clothes".

Regarding the "sex/age", which is one of the modals, a frame selection criterion, based on which a frame effective in determining the sex/age is selectable, such as the distance between the eyes is largest, is set in a time box. The best frame selecting unit 15 selects a frame image that satisfies the aforementioned frame selection criterion as a best frame regarding the modal "sex/age" from the frame images in a time box, for example. In the example of FIG. 3A, the best frame selecting unit 15 selects the frame image 20f in the time box B1 as a best frame regarding the "sex/age", and notifies the selection information to the object feature quantity collecting unit 13. Upon receiving the selection information, the object feature quantity collecting unit 13 associates the feature quantity of the "sex/age" extracted from the best frame with the frame number 20f of the best frame selected regarding the "sex/age" in the time box B1, and stores the feature quantity in the object feature quantity storage unit 20. Contrary to the above, the object feature quantity collecting unit 13 does not store the feature quantity of the "sex/age" of the frame images that are not selected as a best frame regarding the "sex/age".

As described above, in the first exemplary embodiment, frame selection criteria are set for each of the modals. Therefore, it is possible to extract a feature quantity from an appropriate frame image for each of the modals, while selecting a best frame for each of the modals. This is advantageous in enhancing the quality of the feature quantity. In the first exemplary embodiment, only the feature quantity extracted from the frame images selected as a best frame are stored. This is advantageous in suppressing an increase in the capacity of a database.

A value for use in selecting a frame as described above, such as a distance between the eyes, or an assurance on the color of the clothes, is a value calculated in extracting a feature quantity of the face or the clothes by the object feature quantity extracting unit 12. Further, a value for use in selecting a frame, such as a gap of orientation of the face with respect to the front direction, or a blur of the face image is a value calculated at the time of detecting a person or a modal by the object tracking/detecting unit 11. Note that the best frame selecting unit 15 may select a frame image by e.g. performing a specific analysis process for frame selection by a method other than the aforementioned method.

Further, in the foregoing description, a best frame is selected for each of the modals after each of the modals is detected and a feature quantity of each of the modals is extracted, as an example. The order of the process, however, is not specifically limited. For example, it is possible to select a best frame for each of the modals before the feature quantity of each of the modals is extracted, and to extract a feature quantity only for the selected best frame.

The object feature quantity collecting unit 13 not only stores a feature quantity of a frame image selected as a best frame in the object feature quantity storage unit 20 for each of the modals, but also stores position information of each of the modals in the frame image. Specifically, as illustrated by the rectangular marks in FIG. 3A, the object feature quantity collecting unit 13 stores position information of each of the modals in association with the frame numbers of all the frame images. The black circle marks in FIG. 3A indicate the feature quantity of each of the modals. As described above, only the feature quantity of the selected frame images are stored.

Further, the object feature quantity collecting unit 13 stores the feature quantity and the position information of each of the modals illustrated in FIG. 3A for each of the detected persons. In other words, the object feature quantity collecting unit 13 stores the frame numbers in association with each of the person IDs, and further stores the feature quantity and the position information of each of the modals in association with the frame numbers.

As described above, storing the person IDs for identifying the persons, and the position information of each of the modals, it is possible to increase freedom in search such as a search of a certain person or a search of each of the designated modals.

In the foregoing description, the best frame selecting unit 15 selects a best frame in a time box for each of the modals, as an example. Alternatively, the best frame selecting unit 15 may select two or more frame images in a time box for one modal. Then, the best frame selecting unit 15 may store, in the object feature quantity storage unit 20, the feature quantity of the modals extracted from each of the selected frame images. In this case, a frame selection criterion to be set for each of the modals is not a criterion based on which a frame is selected, such as "the distance between the eyes is largest", but is a criterion based on which two or more frame images are selectable, such as "a certain value is equal to or larger than a threshold value".

Further, in the first exemplary embodiment, the best frame selecting unit 15 selects one or more frame images in a time box which is set in advance. Alternatively, a time box may not be provided. In other words, the best frame selecting unit 15 may simply select, as necessary, a frame image that satisfies a frame selection criterion set for each of the modals. In this case, the best frame selecting unit 15 may select a frame image away from a preceding frame image by a predetermined time period or longer for each of the modals. For example, as illustrated in FIG. 3B, it is assumed that a time box is not set, and images indicated by the frame numbers 10f, 15f, and 35f are selected as frame images that satisfy the frame selection criterion set regarding the modal "face" (see the black circle marks). In this case, the time interval D1 between the frame images indicated by the frame numbers 10f and 15f is shorter than a predetermined threshold value. Therefore, the best frame selecting unit 15 does not select the frame image indicated by the frame number 15f as a best frame regarding the modal "face" (see the cross mark). On the other hand, the time interval D2 between the frame images indicated by the frame numbers 10f and 35f is longer than the predetermined threshold value. Therefore, the best frame selecting unit 15 selects the frame images indicated by the frame numbers 10f and 35f as a best frame regarding the modal "face".

Next, the configuration of the object search unit 30 (search unit) which searches a modal and a person with use of a feature quantity of each of the modals stored in the object feature quantity storage unit 20 as described above is described. The object search unit 30 includes the search object best frame selecting unit 31 and the feature quantity search unit 32. The object search unit 30 is operated in response to a search request from the search client unit 40.

In the first exemplary embodiment, as an example of the search, a case that "red clothes" is searched as a first search, and the "face" of a person wearing red clothes is searched among objects searched by the first search as a second search, is described.

First of all, the search client unit 40 designates a modal as a search object from a predetermined frame image, and inputs a search request. Specifically, the searcher visually searches a frame image including a person wearing the "red clothes" in a video image, and selects the frame image using the search client unit 40. Subsequently, as illustrated by an arrow in a part A of FIG. 5, the searcher selects the position R2 of the modal "clothes" in the frame image using the search client unit 40 (Step S11 in FIG. 9). Then, the search client unit 40 notifies the frame ID of the selected frame image and the position information of the position R2 to the search object best frame selecting unit 31, thereby requests a search.

Subsequently, the search object best frame selecting unit 31 specifies the modal associated with the frame ID and the position information notified from the search client unit 40 based on the position information of each of the modals stored in the object feature quantity storage unit 20. In this example, as illustrated by an arrow Y1 in FIG. 6, the selected modal is specified as the "clothes".

Subsequently, the search object best frame selecting unit 31 searches the best frame selected by the best frame selecting unit 15 regarding the selected modal "clothes" in the object feature quantity storage unit 20. Specifically, as illustrated by the arrow Y2 in FIG. 6, the search object best frame selecting unit 31 specifies the frame number of the frame image of which the feature quantity of the modal "clothes" is stored in the object feature quantity storage unit 20. Then, the search object best frame selecting unit 31 reads the feature quantity of the modal "clothes" associated with the specified frame number (Step S12 in FIG. 9), and transmits the read feature quantity to the feature quantity search unit 32.

The feature quantity search unit 32 searches the other frame images including the feature quantity of the modal "clothes" in the best frame in the object feature quantity storage unit 20 (Step S13 in FIG. 9). Specifically, the feature quantity search unit 32 searches the "red clothes" with use of only the feature quantity extracted from the frame image that is determined to be the best frame regarding the modal "clothes" in each of different time boxes, as a search object.

Subsequently, the feature quantity search unit 32 specifies all the frame images including the "red clothes" as a search object, and extracts the frame images, the person IDs associated with the frame images and the position information of each of the modals. Then, the feature quantity search unit 32 returns all the frame images including the search object to the search client unit 40. Then, as illustrated in a part B of FIG. 5, the frame images including the search object are displayed on the search client unit 40 (Step S14 in FIG. 9).

Subsequently, as illustrated in a part A of FIG. 7, the search client unit 40 searches further using the searched frame images A1. In this example, the person of the "face" included in the frame images is searched from the frame images including the "red clothes" as a search object.

The search client unit 40 specifies a frame image including a person who is assumed to be the person to be visually searched in the frame images searched as described above, and as illustrated by the arrow in the part A of FIG. 7, the search client unit 40 selects the area R1 of the modal "face" as a search object in the frame image (Step S15 in FIG. 9). Then, the search object best frame selecting unit 31 specifies the modal associated with the position R1 in the frame image selected by the search client unit 40 based on the position information of each of the modals stored in the object feature quantity storage unit 20. In this example, as illustrated by an arrow Y11 in FIG. 8, the selected modal is specified as the "face".

Subsequently, as illustrated by an arrow Y12 in FIG. 8, the search object best frame selecting unit 31 selects a best frame regarding the modal "face", which is selected by the best frame selecting unit 15, from the frames stored in the object feature quantity storage unit 20. In other words, the frame including the "face" selected by the search client unit 40 as described above is a best frame regarding the modal "clothes", but is not a best frame regarding the "face". Therefore, the search object best frame selecting unit 31 selects a best frame regarding the "face" in the same time box. Specifically, as illustrated by the arrow Y12 in FIG. 8, the search object best frame selecting unit 31 specifies the frame number of the frame image including the feature quantity of the modal "face" stored in the object feature quantity storage unit 20 from the frame images associated with the same person ID as the person ID of the person selected by the search client unit 40. Then, the search object best frame selecting unit 31 reads the feature quantity of the modal "face" associated with the frame number (Step S16 in FIG. 9), and transmits the read feature quantity to the feature quantity search unit 32.

The feature quantity search unit 32 searches the other frame images including the feature quantity of the modal "face", which are read from the object feature quantity storage unit 20, in the object feature quantity storage unit 20 (Step S17 in FIG. 9). Specifically, the feature quantity search unit 32 searches the "face", with use of only the feature quantity extracted from a frame image which is judged to be a best frame regarding the modal "face" in each of the time boxes, as a search object.

Subsequently, the feature quantity search unit 32 specifies all the frame images including the searched "face", and extracts the frame images, the person IDs associated with the frame images, and the position information of each of the modals. Then, the feature quantity search unit 32 returns all the frame images including the search object to the search client unit 40 (Step S18 in FIG. 9), and as illustrated in a part B of FIG. 7, the feature quantity search unit 32 displays the frame images including the search object on the search client unit 40.

As described above, according to the first exemplary embodiment, a frame image that satisfies a frame selection criterion is selected for each of the modals of a person in moving image data, and a feature quantity of each of the modals is stored. Thus, the feature quantity to be stored is the feature quantity extracted from a best frame for each of the modals, resulting in enhancing the quality. Thus, it is possible to enhance the precision of search of modals with use of feature quantity.

Further, only a feature quantity extracted from a best frame is stored for each of the modals. This eliminates the need of storing all the feature quantities. This is advantageous in reducing the storage capacity. Further, accompanied by reduction of the storage capacity, the number of feature quantities as a search object is reduced. This is advantageous in increasing the search speed.

<Supplementary Note>

A part or all of the exemplary embodiment may be described as the following Supplementary Notes. In the following, the configurations of the information processing system (see FIG. 10 and FIG. 11), the program, and the information processing method according to the present invention are briefly described. Note that the present invention is not limited to the following configurations.

Figure 10:
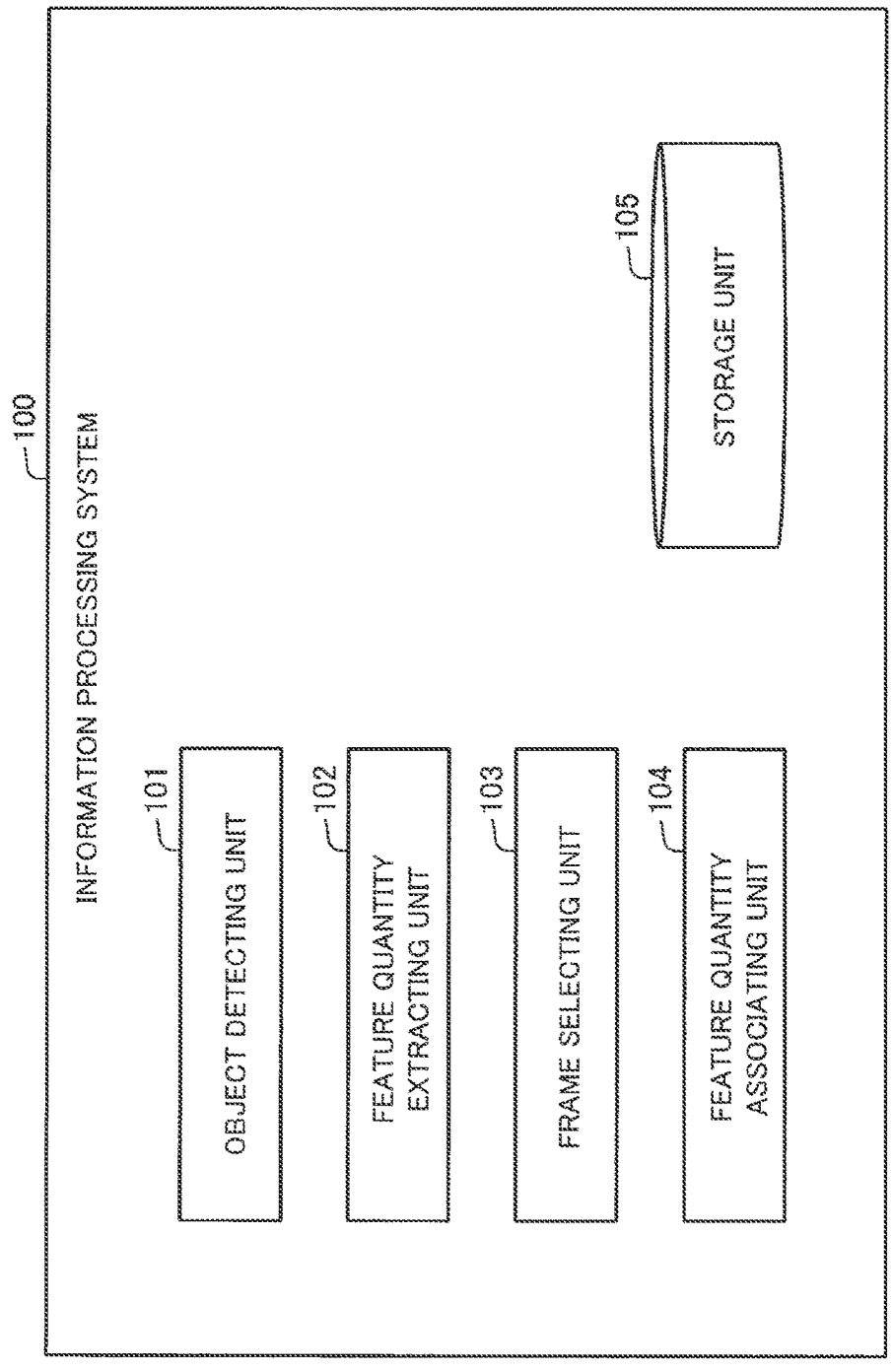
FIG. 10 is a block diagram illustrating a configuration of an information processing system according to Supplementary Note 1 of the present invention.

(Supplementary Note 1) (see FIG. 10)

An information processing system 100 includes:

an object detecting unit 101 that detects and tracks an object in moving image data, and detects a plurality of object elements from the object, each of the object elements representing an element of the object set in advance and detectable from the object;

a feature quantity extracting unit 102 that extracts a feature quantity of each of the object elements from a frame image constituting the moving image data;

a frame selecting unit 103 that selects the frame image satisfying a frame selection criterion for each of the object elements, the frame selection criterion being set in advance for each of the object elements; and a feature quantity associating unit 104 that associates frame specifying information for specifying the frame image selected by the frame selecting unit with the feature quantity of the object element extracted from the selected frame image, and stores those in a storage unit 105.

According to the above, a frame image that satisfies a frame selection criterion is selected for each of the object elements of an object in moving image data. Then, a feature quantity of the object element extracted from the frame image, and frame specifying information for specifying the selected frame image are stored in association with each other for each of the object elements. According to this configuration, the feature quantity of each of the object elements is extracted from a frame image that satisfies the frame selection criterion of each of the object elements. Thus, it is possible to enhance the quality of the feature quantity of each of the object elements. This is advantageous in enhancing the search precision of object elements with use of feature quantity thereafter.

(Supplementary Note 2)

The information processing system according to Supplementary Note 1, wherein the frame selecting unit selects the frame image, for each of the object elements, using at least one of a detection result of the object detecting unit and an extraction result of the feature quantity extracting unit.

As described above, by selecting a frame image for each of the object elements with use of a detection result of an actual object or object elements and an extraction result of feature quantity, it is possible to select an appropriate frame image for each of the object elements. Therefore, it is possible to enhance the quality of a feature quantity of the selected frame image for each of the object elements, and to search object elements with use of the feature quantity with high precision.

(Supplementary Note 3)

The information processing system according to Supplementary Note 1 or 2, wherein the frame selecting unit selects the frame image, for each of the object elements, from the frame images belonging to a time range, for each of the times ranges set in advance along a reproduction time period of the moving image data.

(Supplementary Note 4)

The information processing system according to Supplementary Note 3, wherein the frame selecting unit selects at least one of the frame images for each of the object elements in each of the time ranges.

(Supplementary Note 5)

The information processing system according to Supplementary Note 1 or 2, wherein the frame selecting unit selects the frame image away from a preceding frame image by a predetermined time period or longer for each of the object elements.

According to the aforementioned configuration, a frame image that satisfies a predetermined criterion is selected in each of the set time ranges or at a position away from a preceding frame image by a predetermined time period or longer for each of the object elements. Thus, it is possible to store the feature quantity of each of the frame images at an appropriate time interval. This is advantageous in enhancing the search precision thereafter.

(Supplementary Note 6)

The information processing system according to any one of Supplementary Notes 1 to 5, further includes a search unit that searches each of the object elements using the feature quantity of each of the object elements stored in the storage unit.

(Supplementary Note 7)

The information processing system according to Supplementary Note 6, wherein when the frame image is designated under a predetermined condition and the feature quantity of each of the object elements is not stored in association with the frame specifying information for specifying the designated frame image, the search unit searches each of the object elements using the feature quantity of each of the object elements associated with the frame specifying information for specifying the frame image other than the designated frame image.

(Supplementary Note 8)

The information processing system according to Supplementary Note 6 or 7, wherein the object detecting unit attaches object identification information for identifying the object for each of the objects detected in the moving image data, the feature quantity associating unit stores, in the storage unit, the frame specifying information for specifying the frame image that is selected by the frame selecting unit and the frame image that is not selected by the frame selecting unit, and the object identification information attached to the object detected by the object detecting unit in association with each other, and the search unit searches each of object elements using the feature quantity of each of the object elements associated with the frame specifying information for specifying the other frame images including the same object as the object included in the frame image designated in a predetermined condition on the basis of the object identification information associated with the frame specifying information.

(Supplementary Note 9)

The information processing system according to any one of Supplementary Notes 6 to 8, wherein the object detecting unit detects position information of each of the object elements of the object, the feature quantity associating unit stores, in the storage unit, the frame specifying information for specifying the frame image that is selected by the frame selecting unit and the frame image that is not selected by the frame selecting unit, and the position information of the object element detected by the object detecting unit in association with each other, and the search unit specifies one of the object elements located at a further designated position in the frame image designated in a predetermined condition on the basis of the position information of the object element associated with the frame specifying information, and searches the one object element with use of the feature quantity associated with the frame specifying information for specifying the other frame images including the same object element as the one object element.

(Supplementary Note 10)

The information processing system according to any one of Supplementary Notes 7 to 9, wherein the search unit searches each of the object elements with use of the feature quantity of each of the object elements associated with the frame specifying information for specifying the other frame images located in predetermined ranges before and after the frame image designated under a predetermined condition along a reproduction time period of the moving image data.

According to this configuration, it is possible to search each of the object elements with use of the feature quantity extracted from a frame image that satisfies a frame selection criterion for each of the object elements. This is advantageous in enhancing the search precision of object elements.

Figure 11:
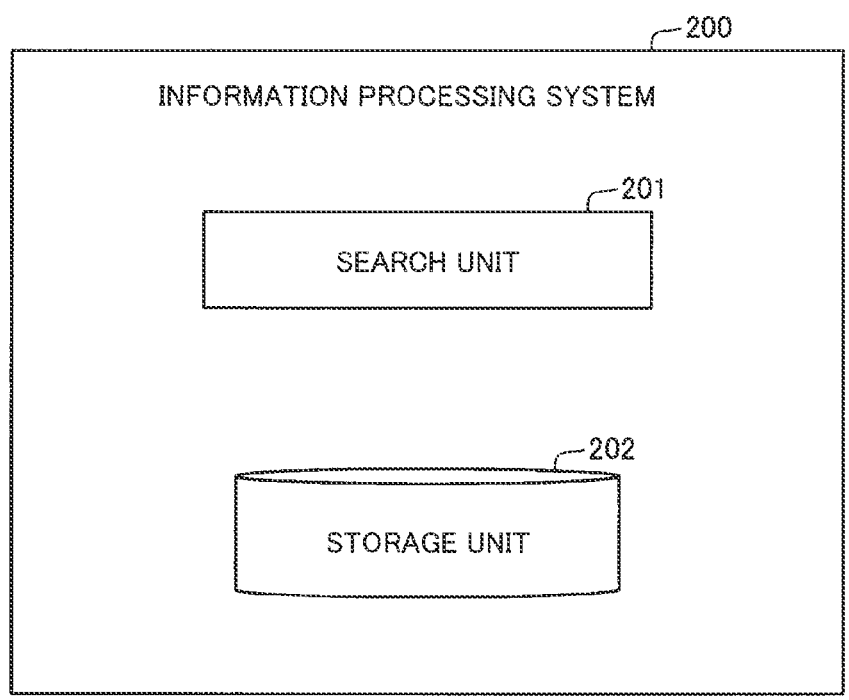
FIG. 11 is a block diagram illustrating a configuration of an information processing system according to Supplementary Note 11 of the present invention.

(Supplementary Note 11) (see FIG. 11)

An information processing system 200, includes:

a search unit 201 that refers to a storage unit 202, and searches each of object elements with use of a feature quantity of each of the object elements, the storage unit storing the feature quantity of the object element extracted from a frame image selected based on a frame selection criterion for each of the object elements and frame specifying information for specifying the selected frame image in association with each other, the frame selection criterion being set in advance for each of the object elements representing elements of an object detected in moving image data.

(Supplementary Note 12)

The information processing system according to Supplementary Note 11, wherein when the frame image is designated under a predetermined condition and the feature quantity of each of the object elements is not stored in association with the frame specifying information for specifying the designated frame image, the search unit searches each of the object elements using the feature quantity of each of the object elements associated with the frame specifying information for specifying the frame images other than the designated frame image.

(Supplementary Note 13)

A program which causes an information processing device to implement:

an object detecting unit that detects and tracks an object in moving image data, and that detects a plurality of object elements from the object, each of the object elements representing an element of the object set in advance and detectable from the object;

a feature quantity extracting unit which extracts a feature quantity of each of the object elements from frame images constituting the moving image data;

a frame selecting unit that selects the frame image that satisfies a frame selection criterion for each of the object elements, the frame selection criterion being set in advance for each of the object elements; and a feature quantity associating unit that associates frame specifying information for specifying the frame image selected by the frame selecting unit with the feature quantity of the object element extracted from the selected frame image, and stores those in a storage unit.

(Supplementary Note 14)

The program according to Supplementary Note 13, wherein the program further causes the information processing device to implement a search unit that searches each of the object elements using the feature quantity of each of the object elements stored in the storage unit.

(Supplementary Note 15)

A program which causes an information processing device to implement a search unit that refers to a storage unit, and searches each of object elements with use of a feature quantity of each of the object elements, the storage unit storing the feature quantity of the object element extracted from a frame image selected based on a frame selection criterion for each of the object elements and frame specifying information for specifying the selected frame image in association with each other, the frame selection criterion being set in advance for each of the object elements representing elements of an object detected in moving image data.

(Supplementary Note 16)

The program according to Supplementary Note 15, wherein when the frame image is designated under a predetermined condition and the feature quantity of each of the object elements is not stored in association with the frame specifying information for specifying the designated frame image, the search unit searches each of the object elements using the feature quantity of each of the object elements associated with the frame specifying information for specifying the frame images other than the designated frame image.

(Supplementary Note 17)

An information processing method, includes:

detecting and tracking an object in moving image data, and detecting a plurality of object elements from the object, each of the object elements representing an element of the object set in advance and detectable from the object;

extracting a feature quantity of each of the object elements from frame images constituting the moving image data;

selecting the frame image that satisfies a frame selection criterion before and after extracting the feature quantity, for each of the object elements, the frame selection criterion being set in advance for each of the object elements; and associating frame specifying information for specifying the frame image selected by a frame selecting unit with the feature quantity of the object element extracted from the selected frame image, and storing those in a storage unit.

(Supplementary Note 18)

The information processing method according to Supplementary Note 17, further includes:

searching each of the object elements using the feature quantity of each of the object elements stored in the storage unit.

(Supplementary Note 19)

An information processing method, includes:

referring to a storage unit, and searching each of object elements with use of a feature quantity of each of the object elements, the storage unit storing the feature quantity of the object element extracted from a frame image selected based on a frame selection criterion for each of the object elements and frame specifying information for specifying the selected frame image in association with each other, the frame selection criterion being set in advance for each of the object elements representing elements of an object detected in moving image data.

(Supplementary Note 20)

The information processing method according to Supplementary Note 19, wherein when the frame image is designated under a predetermined condition and the feature quantity of each of the object elements is not stored in association with the frame specifying information for specifying the designated frame image, each of the object elements is searched using the feature quantity of each of the object elements associated with the frame specifying information for specifying the frame images other than the designated frame image.

The aforementioned program is stored in a storage device, or is recorded in a computer-readable recording medium. For example, the recording medium is a portable medium such as a flexible disk, an optical disc, a magneto-optical disk, or a semiconductor memory.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2013-200065, filed on Sep. 26, 2013, the disclosure of which is incorporated herein in its entirety by reference.

REFERENCE SIGNS LIST

1 Camera
2 Video input unit
10 Video analysis unit
11 Object tracking/detecting unit
12 Object feature quantity extracting unit
13 Object feature quantity collecting unit
14 Video-based analysis setting unit
15 Best frame selecting unit
20 Object feature quantity storage unit
30 Object search unit
31 Search object best frame selecting unit
32 Feature quantity search unit
40 Search client unit
100 Information processing system
101 Object detecting unit
102 Feature quantity extracting unit
103 Frame selecting unit
104 Feature quantity associating unit
105 Storage unit
200 Information processing system
201 Search unit
202 Storage unit

The invention claimed is:

1. An information processing system, comprising:
a processor configured to:
  detect and track an object in moving image data, and detect a plurality of object elements from the object, each of the object elements representing an element of the object set in advance and detectable from the object;
  extract a feature quantity of each of the object elements from a frame image constituting the moving image data;
  select the frame image satisfying a frame selection criterion for each of the object elements, the frame selection criterion being set in advance for each of the object elements; and
  associate frame specifying information for specifying the selected frame image with the feature quantity of the object element extracted from the selected frame image.

2. The information processing system according to claim 1, wherein the processor is further configured to:
select the frame image, for each of the object elements, based on at least one of the detection result and the feature extraction result.

3. The information processing system according to claim 1, wherein the processor is further configured to:
select the frame image, for each of the object elements, from the frame images belonging to a time range, for each of the time ranges set in advance along a reproduction time period of the moving image data.

4. The information processing system according to claim 3, wherein the processor is further configured to:
select at least one of the frame images for each of the object elements in each of the time ranges.

5. The information processing system according to claim 1, wherein the processor is further configured to:
select the frame image away from a preceding frame image by a predetermined time period or longer for each of the object elements.

6. The information processing system according to claim 1, wherein the processor is further configured to:
search each of the object elements using the feature quantity of each of the object elements stored in a predetermined storage.

7. The information processing system according to claim 6,
wherein when the frame image is designated under a predetermined condition and when the feature quantity of each of the object elements is not stored in association with the frame specifying information for specifying the designated frame image, the processor is further configured to:

search each of the object elements using the feature quantity of each of the object elements associated with the frame specifying information for specifying the frame image other than the designated frame image.

8. The information processing system according to claim 6, wherein the processor is further configured to:
attach object identification information for identifying the object for each of the objects detected in the moving image data;
store, in the storage, the frame specifying information for specifying the selected frame image and the frame image that is not selected, and the object identification information attached to the detected object in association with each other; and
search each of object elements using the feature quantity of each of the object elements associated with the frame specifying information for specifying the other frame images including the same object as the object included in the frame image designated in a predetermined condition on the basis of the object identification information associated with the frame specifying information.

9. The information processing system according to claim 6, wherein the processor is further configured to:
detect position information of each of the object elements of the object;
store, in the storage, the frame specifying information for specifying the selected frame image and the frame image that is not selected, and the position information of the object element in association with each other;
specify one of the object elements located at a further designated position in the frame image designated in a predetermined condition on the basis of the position information of the object element associated with the frame specifying information; and
search the one object element with use of the feature quantity associated with the frame specifying information for specifying the other frame images including the same object element as the one object element.

10. The information processing system according to claim 7, wherein the processor is further configured to:
search each of the object elements with use of the feature quantity of each of the object elements associated with the frame specifying information for specifying the other frame images located in a predetermined range before and after the frame image designated under a predetermined condition along a reproduction time period of the moving image data.

11. An information processing system, comprising:
a processor configured to:
refer to a storage; and
search each of object elements with use of a feature quantity of each of the object elements, the storage storing the feature quantity of the object element extracted from a frame image selected based on a frame selection criterion for each of the object elements and frame specifying information for specifying the selected frame image in association with each other, the frame selection criterion being set in advance for each of the object elements representing elements of an object detected in moving image data.

12. The information processing system according to claim 11, wherein when the frame image is designated under a predetermined condition and the feature quantity of each of the object elements is not stored in association with the frame specifying information for specifying the designated frame image, the processor is further configured to:
search each of the object elements using the feature quantity of each of the object elements associated with the frame specifying information for specifying the frame image other than the designated frame image.

13. A non-transitory computer-readable recording medium storing a program, the program causing an information processing device to implement:
an object detecting unit that detects and tracks an object in moving image data, and that detects a plurality of object elements from the object, each of the object elements representing an element of the object set in advance and detectable from the object;
a feature quantity extracting unit which extracts a feature quantity of each of the object elements from frame images constituting the moving image data;
a frame selecting unit that selects the frame image that satisfies a frame selection criterion for each of the object elements, the frame selection criterion being set in advance for each of the object elements; and
a feature quantity associating unit that associates frame specifying information for specifying the frame image selected by the frame selecting unit with the feature quantity of the object element extracted from the selected frame image, and stores those in a storage unit.

14. The non-transitory computer-readable recording medium according to claim 13, wherein the stored program further causes the information processing device to implement a search unit which searches each of the object elements using the feature quantity of each of the object elements stored in the storage unit.

15. An information processing method, comprising:
detecting and tracking an object in moving image data, and detecting a plurality of object elements from the object, each of the object elements representing an element of the object set in advance and detectable from the object;
extracting a feature quantity of each of the object elements from frame images constituting the moving image data;
selecting the frame image that satisfies a frame selection criterion before and after extracting the feature quantity, for each of the object elements, the frame selection criterion being set in advance for each of the object elements; and
associating frame specifying information for specifying the frame image selected by a frame selecting unit with the feature quantity of the object element extracted from the selected frame image, and storing those in a storage unit.

16. The information processing method according to claim 15, further comprising:
searching each of the object elements using the feature quantity of each of the object elements stored in the storage unit.

* * * * *